(12) United States Patent
Barthes et al.

(10) Patent No.: US 7,207,818 B1
(45) Date of Patent: Apr. 24, 2007

(54) TELECOMMUNICATIONS ASSEMBLY INCLUDING AT LEAST ONE TELECOMMUNICATIONS MODULE

(75) Inventors: Guy J. Barthes, Cluses (FR); Guy Metral, Cluses (FR)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/247,402

(22) Filed: Oct. 11, 2005

(51) Int. Cl.
*H01R 29/00* (2006.01)
(52) U.S. Cl. .................................... 439/188; 439/922
(58) Field of Classification Search ............... 439/188, 439/709, 22, 856, 857, 922; 361/119
See application file for complete search history.

(56) References Cited

U.S. PATENT DOCUMENTS 5,575,689 A * 11/1996 Baggett et al. ............. 439/709
5,800,215 A    9/1998 Dohnke et al.

FOREIGN PATENT DOCUMENTS

| EP | 0 847 106 B1 | 6/1998 |
| EP | 1 482 744 A1 | 12/2004 |
| WO | WO 00/04607 | 1/2000 |

* cited by examiner

*Primary Examiner*—Neil Abrams
(74) *Attorney, Agent, or Firm*—Janet A. Kling; John A. Burtis

(57) ABSTRACT

A telecommunications module has a front and a rear side and at least two contacts which are in disconnectable contact with each other at a disconnection point, wherein at least one contact has at least two projections in the vicinity of the disconnection point and on either side of the disconnection point. The contacts can be separated by inserting an external component or a portion thereof in an insertion direction between the projections. This manner of separation of the contacts without contacting any of the disconnection points results in less abrasion at these points. At least one of the projections formed on a contact of a telecommunications module in the vicinity of a disconnection point may be used as a test access to the contact.

9 Claims, 3 Drawing Sheets

TELECOMMUNICATIONS ASSEMBLY INCLUDING AT LEAST ONE TELECOMMUNICATIONS MODULE

The invention relates to a telecommunications module, an assembly including at least one telecommunications module and use of a projection formed on a contact of a telecommunications module.

BACKGROUND

In the field of telecommunications, numerous customers are connected with the switch of a telecommunications company over telecommunications lines. Such customers are also sometimes referred to as subscribers. The switch is also often called an exchange or "PBX" (central office exchange operated by the telecommunications company). Between the subscriber and the switch, sections of telecommunications lines are connected with telecommunications modules. Telecommunications modules establish an electrical connection between one wire attached to the telecommunications module at a first side and another wire attached to the telecommunications module at a second side. The wires of one side can be called incoming wires and the wires of the other side can be called outgoing wires. Plural telecommunications modules can be put together at a distribution point, such as a main distribution frame (or "MDF"), an intermediate distribution frame, an outside cabinet or at some other distribution point located, for example, in an office building or on a particular floor of an office building. To allow flexibility in wiring some telecommunications lines are connected with a set of first telecommunications modules in a manner to constitute a permanent connection. Flexibility is realized by so-called jumpers or cross connects, which flexibly connect contacts of the first telecommunications modules with contacts of a second set of telecommunications modules. These jumpers can be changed when, for example, a person moves within an office building to provide a new telephone (i.e., a different telephone line) with a telephone number the relocated person intends to keep. Such a change of jumpers can be called patching or cross-connecting. Within the telecommunications module disconnection points can be located in the electrical connection between the two sides. Disconnection plugs can be inserted at the disconnection points to disconnect the line. Protection plugs and magazines are also sometimes used. These are connected to the module and protect any equipment connected to the wires from overcurrent and overvoltage. Test plugs can also be inserted at a disconnection point to test or monitor a line.

Recently, Asymmetric Digital Subscriber Line, or "ADSL," technology has spread widely in the field of telecommunications. ADSL allows at least two different signals to be transmitted on a single line and is achieved by transmitting the different signals at different frequencies along the line. Signals are combined at a particular point in the telecommunications line and split at another point. In particular, at the subscriber side separate voice and data signals are combined and sent to the central office over one line. In the central office the combined signal is split. For the transmission of voice and data signals to the subscriber, separate voice and data signals are combined at the central office, sent to the subscriber and split at the subscriber side. After splitting the signal, the POTS, or "plain old telephone service," can be used to transmit voice signals. The remaining part of the split signal can be used to transmit data or other information. Splitters, which are used to split or combine the signal, can generally be arranged at any distribution point.

Any electronic components necessary to perform the above functions can be contained, sometimes together with a printed circuit board as a base, in a functional module, and the entire module may function as a splitter. Similar functional modules include protection modules, which contain components that provide protection against overvoltage and/or overcurrent or testing and monitoring modules, which contain suitable electronic components and circuits to test or monitor a telecommunications line. Other functional plugs are known to those skilled in the art.

These functional plugs may be inserted into a receiving space of the telecommunications module. Specifically, the contacts of the functional plug can establish electrical contact with the contacts of the telecommunications module. When a functional plug is not inserted opposing contacts within the telecommunications module can be in electrical contact with each other at a disconnection point. The contacts can be separated by inserting a functional plug where electrical contact between the separated contacts of the telecommunications module and the contacts of the functional plug can be established.

SUMMARY OF THE INVENTION

In one aspect of the present invention provides a telecommunications module in which two contacts are in disconnectable contact at a disconnection point and in which the reliability of the contact at the disconnection point may be improved. In another aspect, the invention provides an assembly including at least one such telecommunications module.

In still another aspect, the invention provides a use of a projection formed on a contact of a telecommunications module in the vicinity of a disconnection point at which at least two contacts are in disconnectable contact with each other. As described more fully herein, a projection is used to space the contacts from each other without contacting the disconnection point. In a second use, the projection may be used as a test access to the contact and, thus, form a second contact point next to the contact point which forms the disconnection point.

BRIEF DESCRIPTION OF THE DRAWINGS

The invention will be described hereinafter in part by reference to non-limiting examples, illustrated with reference to drawings in which:

FIG. 2a shows a detail of FIG. 1a;

FIG. 4b shows a detail of FIG. 4a

DETAILED DESCRIPTION OF PREFERRED EMBODIMENTS

Figure 1A:
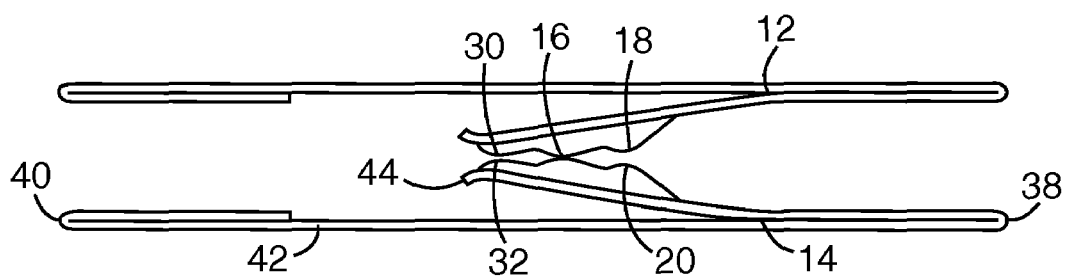
FIG. 1a shows a sectional view of the contacts for a telecommunications module of the current invention

The telecommunications modules of the invention comprise at least two contacts. A contact generally means any component that is adapted to establish electrical connection with at least one outside wire. For this purpose the contact can be formed, for example, at a first end as an Insulation Displacement Contact ("IDC"), a wire wrap contact or in any other suitable manner. The contacts can each have a first end that is adapted to connect a wire. They can also have a second end at which they are in disconnectable contact with each other. This connection can also be formed along the contacts. The point where the contacts are in disconnectable contact with each other is referred to as a disconnection point. At the disconnection point an electrical connection with a further component can be established. This can, for example, be the outside contact of an splitter module. In such a case the signal transmitted from the wire to the first contact is further transmitted to the electronic components of the splitter module and processed. A second contact can also be connected with the splitter module such that the signal processed, split or combined by the splitter module is transmitted via the second contact to a wire connected with the second contact. The first and/or second contact can be at least partially located outside a housing of the telecommunications module.

In the telecommunications modules of the invention at least one contact has at least one projection or protrusion in the vicinity of the disconnection point. With this projection the contacts, which are in disconnectable contact with one another, can be separated by inserting an external component or a portion of an external component in an insertion direction such that it first reaches and contacts the projection. In other words, the external component which acts to separate the contacts first contacts the projection. In this way the main force which serves to separate the contacts acts on the projection, and the contacts are not affected at those locations where they are in disconnectable contact with each other, i.e. at the disconnection point. The external component can, after contacting the projection, also contact the contacts at the disconnection point. The main force for separating the contacts, however, acts on the projection so that the disconnection point is left substantially unaffected and less abrasion and/or erosion occurs at the disconnection point. This maintains reliable electrical contact at the disconnection point for an extended period of time.

The disconnection point can reliably be used for contacting the contacts for various purposes. For example, a splitter module can be inserted to contact each of the contacts at the disconnection point. A "lifeline" service can also be provided when the splitter is removed and the contacts are brought into contact with each other at the disconnection point. The direct electrical connection between the contacts can be used for the lifeline service, since a line contact to which a wire leading to the subscriber is connected and a POTS-contact to which a wire leading to the switch is connected are in contact with each other.

The projection can, moreover, advantageously be used as a second contact point for the contact. Thus, a first contact point can be seen at the disconnection point. The projection formed in the vicinity of the disconnection point on at least one contact can additionally be used to electrically contact this contact such as, for example, when the contacts are separated at the disconnection point by inserting a suitable test device.

It provides advantages when the disconnection point is not contacted by the inserted external component, particularly where the component is inserted beyond the projection which it first contacts. Also, when an external component is inserted too far contact with the disconnection point to protect against erosion and/or abrasion can be realized by the following structure. The disconnection point can be formed on at least one contact such that it projects from a plane parallel to the insertion direction of the external component less than at least one projection projects when the external component is inserted. Thus, the insertion direction is taken as a reference, and a plane parallel to this direction, and preferably parallel to the sheet-metal plane of the contact, is defined. For example, in a cross-sectional view of the telecommunications module, such a plane can be seen as a line parallel to the insertion direction. The disconnection point can advantageously be formed to project far enough such that the contacts are in contact with each other at the disconnection point when there is no external component inserted. However, as described above, when such a component is inserted it first contacts the projection. This causes the contacts to be separated or spaced from each other at the disconnection point. In particular, the projection on one or both contacts can be formed so that it extends far enough towards the opposing contact that insertion of the external component will space the contacts particularly far apart at the disconnection point. This spacing can advantageously be formed large enough to avoid contact between the external component and the disconnection point of both contacts, even when the external component is inserted so as to reach the location of the disconnection point.

The contacts can be in contact with each other both at the disconnection point and at the one or more projections without insertion of an external component. It generally provides advantages with respect to a given contact, however, only at the disconnection point when the contacts are spaced from each other at the at least one projection and when they are in contact at the disconnection point, i.e., without any external component inserted.

The telecommunications modules of the invention may be formed in an efficient manner and with standardized parts, particularly when the contacts are substantially identical to each other and are arranged symmetrically in the telecommunications module. Thus formed, a line of symmetry extends through the disconnection point where the contacts are in contact with each other.

The telecommunications modules can comprise a housing. The housing can be made of plastic or any other suitable material and can be constituted by one or more components. The housing serves to accommodate the contacts of the telecommunications module as described above. The housing may also have specific structures for positioning the contacts. The housing can, moreover, comprise one or more cavities or receiving spaces adapted to accommodate objects such as functional plugs or any other types of modules or module parts. Finally, the housing can also comprise suitable structures, typically at or near the outside, to enable the telecommunications module to be mounted to a rack or any other suitable carrier or to hold or secure objects listed above. The telecommunications modules generally have a front and a rear side. Usually contacts will be exposed at the front side to allow for connection of wires. Functional plugs can be insertable at the front side and/or from a rear side opposite the front side.

In the telecommunications modules of the invention, a disconnection point can be accessible from both the front and the rear side of the module. Thus, projections can be present on one or both opposing contacts in front of the disconnection point, to the rear of the disconnection point or on both sides. The above-described feature that the disconnection point protrudes less than the projection to protect the disconnection point from abrasion, even when an external component is inserted particularly far, can be realized on one of the sides. The described accessibility of the disconnection point both from a front and a rear side corresponds to openings, recesses, receiving spaces and/or cavities formed in the telecommunications module at the front and/or rear side (e.g., in the housing) to render the disconnection point accessible for external components. The insertion of an external component can be performed smoothly when at least one projection is rounded.

As already mentioned, projections can be present on both sides of the disconnection point on at least one contact along the insertion direction. Thus, external components can be inserted from both sides, and the disconnection point can be protected from abrasion and/or erosion.

The telecommunications modules may be used with or without any external components. However, the advantages of the described improvements will be especially useful when a telecommunications module is combined with at least one external component such as a disconnection plug, a protection plug, a splitter module or a test device. For example, two such external components can be inserted simultaneously, or a disconnection plug or test device can be inserted from a front side, and a splitter module can be inserted from a rear side, etc.

The telecommunications modules of the invention can be employed as part of an assembly such as at a distribution point, e.g., a main distribution frame, and such an assembly is to be considered subject matter of the invention.

Figure 1B:
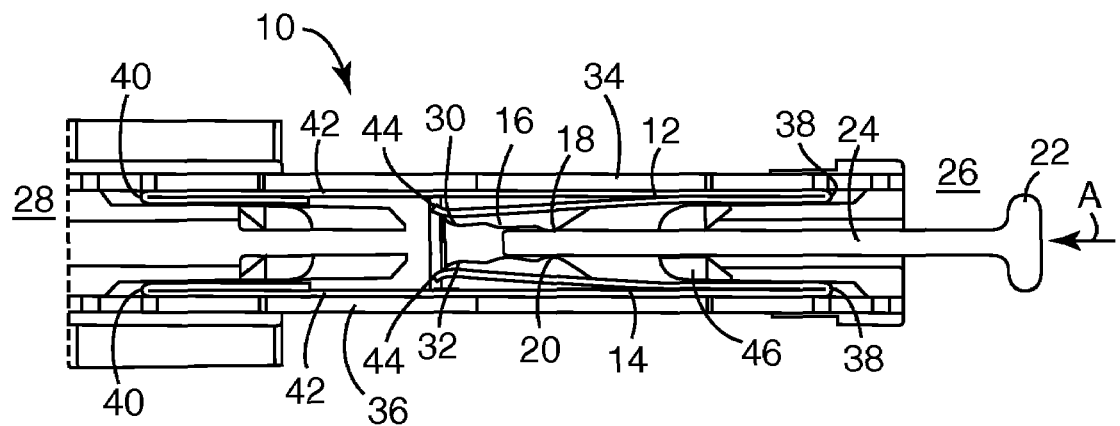
FIG. 1b shows a sectional view of the telecommunications module with a disconnection plug.

FIG. 1a shows a sectional view of the contacts for a telecommunications module, which will be described in more detail below with reference to FIG. 1b. In the embodiment shown, contacts 12, 14 are substantially identical to each other and are arranged symmetrically in a telecommunications module (FIG. 1b). The line of symmetry extends horizontally in FIG. 1a. In the embodiment shown, both the front end 38 and the rear end 40 of both contacts 12, 14 are adapted to connect wires therewith. In the case shown, the ends are formed by folding the contact on itself so as to double the material in the end region. The contacts 12, 14 will generally have a strip-like appearance and can, for example, be stamped from sheet metal. The width of the strip constituting the contact extends perpendicular to the plane of the drawing of FIG. 1a. In the ends 38, 40, a slit extending horizontally in FIG. 1a can be formed to provide an insulation displacement contact ("IDC") zone. Thus, in the embodiment of FIG. 1a, wires are connectable with the contacts 12, 14 on both ends 38, 40 thereof. However, the contacts 12, 14 can also be formed to allow the connection of wires only at one end thereof. In the end region of the rear end 40, the entire portion of the contact, which is folded back onto itself, is parallel with a main portion 42 of the contact. In contrast, the portion of the contact 12, 14, which is folded back at the front end 38, extends, in a first part, parallel to the main portion 42. However, in the embodiment shown the contact is folded approximately at a position corresponding to one half of the bent back portion to be inclined with respect to the main portion 42. This, in the embodiment shown, is the case for both contacts 12, 14 so that they meet at a disconnection point 16.

FIG. 1b shows the telecommunications module 10 which has, in the embodiment shown, a housing made of a front housing part 34 and a rear housing part 36. As shown, 26 denotes a front side and 28 denotes a rear side. The housing parts 34, 36 are joined in any suitable manner and are made of any suitable material such as molded plastic. The housing serves to accommodate and locate at least two contacts 12, 14. The telecommunications module 10 can have an extension in the direction perpendicular to the drawing of FIG. 1b to constitute a strip-like module. In such a module, further contacts 12, 14, which are not visible in FIG. 1b, will be present in front of and behind the contacts 12, 14 shown in FIG. 1b. The contacts 12, 14 can, for example, be arranged in two parallel rows. Telecommunication modules which may utilize the contacts of the disclosed invention include a BRCP module, STG module or STR module available from 3M Company, St. Paul, Minn. (BRCP and STR modules allow mounting of functional plugs on the front and rear sides of the telecommunication module while the STG allows for the mounting of a functional plug on it front side.)

FIG. 1b shows a situation, in which a disconnection plug 22 has been inserted from the front side 26. This disconnection plug 22 has separated or spaced the contacts from each other, by contacting projections 18, 20, respectively, which are formed on the contacts 12, 14. If the disconnection plug 22 was not present, the contacts would be in contact with each other at disconnection point 16. Details regarding the disconnection point 16 as well as the projections 18, 20 will be described in more detail below with reference to FIG. 2.

FIG. 1b additionally shows a second projection 30, 32 on contact 12, 14, respectively. Finally, the free ends 44 of the bent back portions of the contacts 12 are bent away from each other. The projections 18, 20, 30, 32 and/or the contour on contacts 12, 14 for forming the disconnection point 16 can be formed in any suitable manner. For example, a part of the contact, along the width thereof, can be stamped from the remainder on two or more sides, while leaving a connection to the remainder, and can be bent to form the described projections and contours. Moreover, the contacts 12, 14 can be recessed adjacent these contours in order to produce the projections. In the embodiment shown, the front housing part 34 comprises a guide 46 for guiding the disconnection plug 22.

Figure 2A:
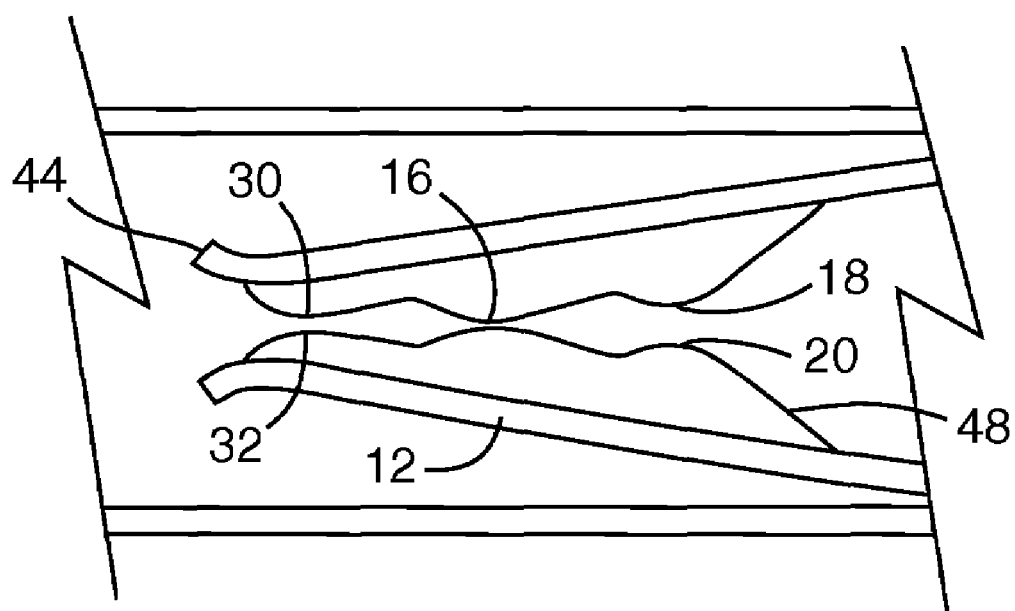

FIG. 2a shows a detail of FIG. 1a. In particular, the formation of the projection 18, 20 and the disconnection point 16 is shown. As can be seen in FIG. 2a, the projections 18, 20, firstly, extend from the respective contact 12, 14 as a kind of ramp 48. At the peak of the projections 18, 20, these are rounded. In the embodiment shown, the disconnection point 16 on each contact 12, 14 also projects from the contact.

Figure 2B:
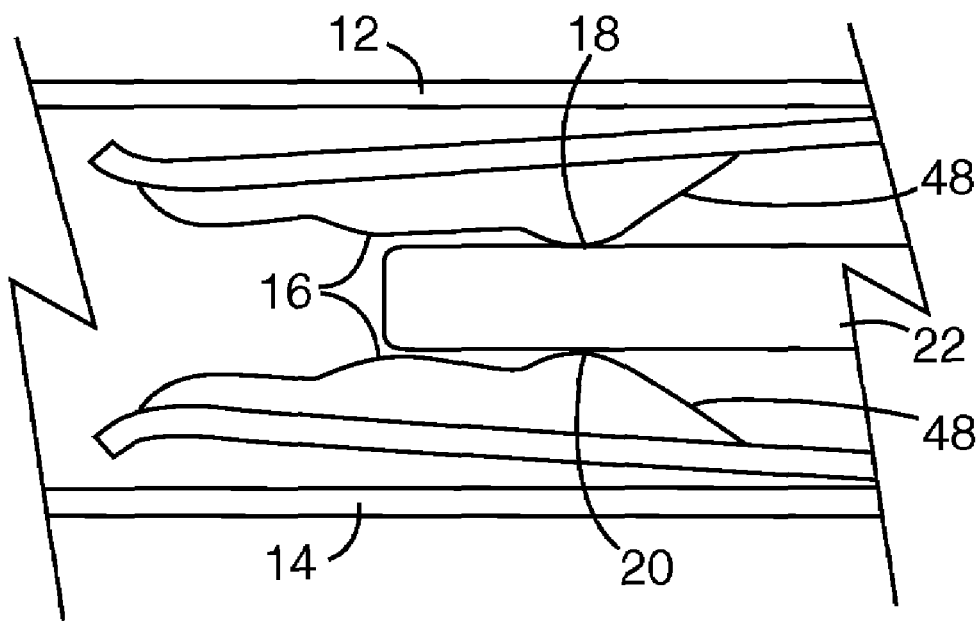
FIG. 2b shows a detail of FIG. 1b.

FIG. 2b shows the end of a main portion 24 of the disconnection plug 22 (FIG. 1b) in greater detail. In the embodiment shown, the edges at the end of the disconnection plug 22 are rounded so that a smooth insertion is achieved. In this embodiment the disconnection point does not extend so far that the disconnection plug 22 can contact the disconnection point 16, even when it is inserted to reach the disconnection point 16. This is because the disconnection plug 22 remains in contact with projections 18, 20, and disconnection points 16 are set back with respect to a plane perpendicular to the plane of the drawing of FIG. 2b and parallel to insertion direction A.

If the disconnection plug 22 is removed, the inclined portions of contacts 12, 14 on which the projections 18, 20 and disconnection point 16 are formed will pivot essentially about that point, where the inclined portion ends and the part of the bent back portion of the contact parallel to the main portion 42 of the contact (see FIG. 1a) begins. This pivoting movement will bring disconnection points 16 in contact with each other, whereas, in the embodiment shown, projections 18, 20 will remain spaced from each other (FIG. 2a). However, the projections 18, 20 can also be formed to be in contact with each other in addition to the disconnection points 16. In any case, when the disconnection plug 22 is inserted, even so far as to reach the disconnection points 16, it does not contact the disconnection point so that the disconnection point is protected from abrasion and erosion. This effect is supported by the guide 46 (FIG. 1b) formed in the telecommunications module which serves to precisely define the position of the disconnection plug in a direction perpendicular to the insertion direction. In other words, the disconnection plug 22 cannot move perpendicular to insertion direction A in a manner to contact the disconnection points 16. Both contacts 12, 14 continue to the left of FIG. 2 in a way to form a second projection 30, 32 on each contact 12, 14.

Figure 3:
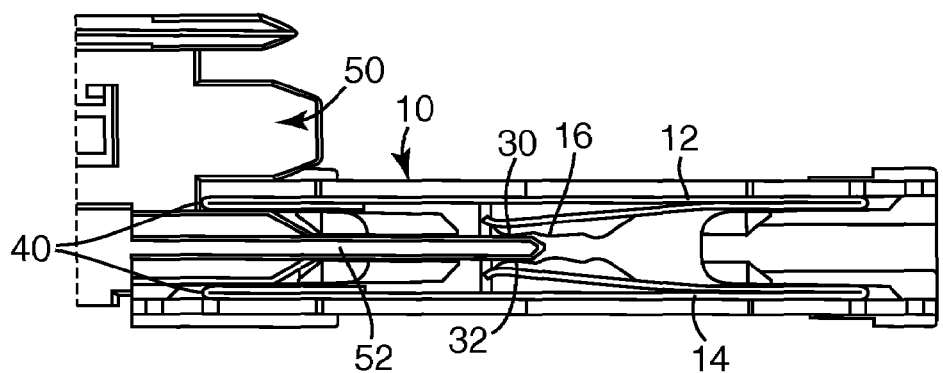
FIG. 3 shows a sectional view of the telecommunications module with a splitter module inserted.

As shown in FIG. 3, this second projection 30, 32 can be used to separate contacts 12, 14 from each other including when an external component, such as a splitter module 50 shown in FIG. 3, is inserted from a rear side. Also, the inserted portion 52 of the splitter module 50 contacts the projections 30, 32 and not the disconnection point 16. Because the inclined portion of the contacts 12, 14 pivots about the above-described point, which is on a side opposite to the side from which the splitter module 50 is inserted, it is possible that the inserted portion 52 of the splitter module 50 will reach and contact the disconnection point 16. This does not, however, damage the disconnection point, as the main force for spacing the contacts 12, 14 apart is applied to the projections 30, 32. Moreover, the telecommunications module 10 can have a suitable stop for defining an end position in the inserted state which can be provided in a manner to prevent the leading end of the inserted portion 52 from reaching the disconnection point 16.

In the embodiment shown, the inserted portion 54 serves to "open" the disconnection point 16 and to electrically isolate the contacts 12, 14. Thus, the inserted portion 52, which can be called a tongue, does not have any electrical function. Rather, the splitter module 50 is in contact with the ends 40 of contacts 12, 14. For this purpose the embodiment shown includes suitable metallic elements which are soldered on a printed circuit board of the splitter module 50 and which serve to establish direct contact with the ends 40 and/or adjacent end portions of contacts 12, 14. It is therefore possible to insert a further module from the front side, as described in more detail below with reference to FIGS. 4a and 4b, without affecting the electrical contact between contacts 12, 14 and splitter module 50.

In this way the splitter module 50 shown in FIG. 3 and the disconnection plug 22 can be inserted into the telecommunications module 10 simultaneously. Moreover, a test device can be inserted from the front 26 and/or the rear side 28 instead of the disconnection plug 22 or the splitter module, respectively, and can contact projections 18, or 30, 32. Thus, these projections 18, 20, 30, 32 can be used as a test access to the contacts. The disconnection point 16 can also, however, be used as a test access when a test device is (in the embodiment of the figures) inserted from a rear side. Moreover, with an appropriate design, for example, having suitable through openings, a test device can also be inserted from a front side. Alternatively, a test device inserted from the front side can contact the disconnection point 16 when the projections 18, 20 are formed different than shown in the figures, i.e., when they are set back somewhat to allow the inserted test device to contact disconnection point 16.

Figure 4A:
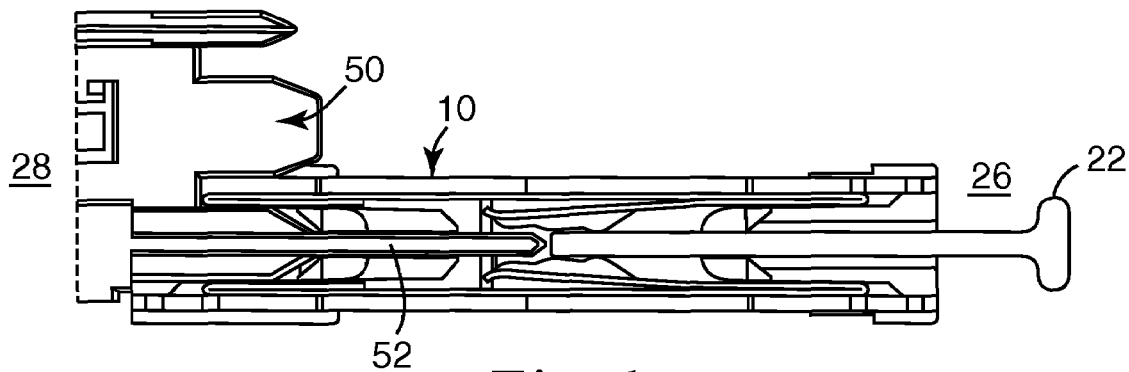
FIG. 4a shows a sectional view of the telecommunications module with a disconnection plug on the rear side and a splitter module on the front side.

FIG. 4a shows a sample of a telecommunication module 10 having two discrete devices mounted to it without interference between the two devices. In the illustrated embodiment, the insertion of the disconnection plug 22 on the front side 26 of the telecommunication module results in the disconnection of the functional plug 50 on the rear side 28 of the telecommunication module. Removal of the disconnection plug 22 will allow normal operation of the functional plug 50 (e.g., a splitter module) to commence. This feature of the contact design to allow a second inserted element in the telecommunication module to disconnect a previously installed functional plug adds functionality to the system by allowing temporary changes in service or functionality without disturbing the original configuration.

Figure 4B:
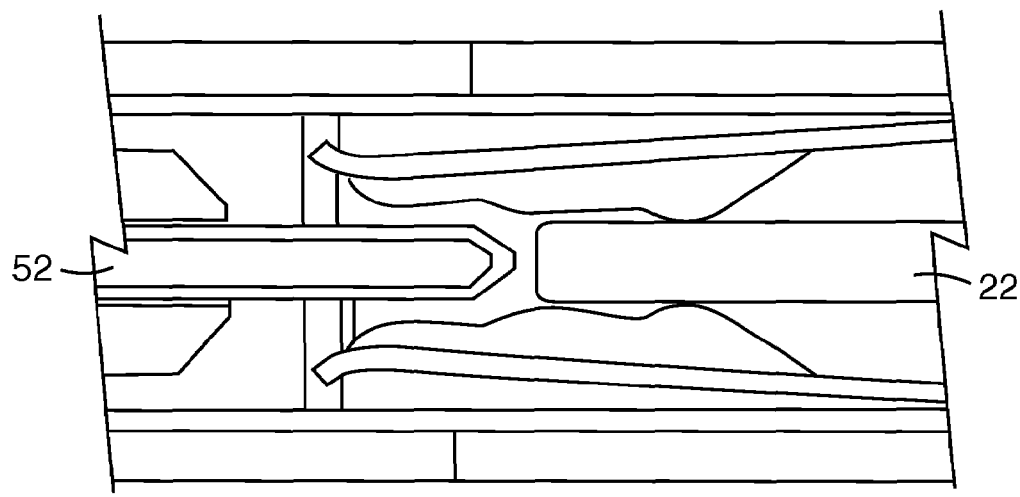

FIG. 4b shows a detailed view of the contact region of the telecommunication module shown in FIG. 4a. It may be desirable to temporarily or permanently install a second module in the front side of the telecommunication module and disconnect the functional plug 50 on the rear side of the telecommunication module without having to physically remove it from service. When a new feature is installed, or when a testing operation takes place, either a functional plug, a test probe or a disconnection plug 22 can be introduced from the module's front side and the rear functional plug 50 can be disconnected from the line. When a front access device is removed, the rear side functional plug features will immediately be re-established. In such accommodation both the front and rear side functional plugs are built in, having conductive tracks accommodated on pins going up to a telecommunication module disconnection area instead of residing only on disconnection pins. Alternatively, however, two functional plugs may be inserted into the telecommunications module and operate normally.

The present invention has now been described with reference to an embodiment thereof. The foregoing detailed description and embodiment have been given for clarity of understanding only. No unnecessary limitations are to be understood there from. For example, all references to front, rear, left and right sides, horizontal, vertical and insertion directions etc., are exemplary only and do not limit the claimed invention. It will be apparent to those skilled in the art that many changes can be made to the embodiment described without departing from the scope of the invention. Thus, the scope of the present invention should not be limited to the exact details and structures described herein, but rather by the structures described by the language of the claims, and the equivalents of those structures.

We claim:

1. A telecommunications module having a front and a rear side and at least two contacts which are in disconnectable contact with each other at a disconnection point, wherein at least one contact has at least two projections on either side of the disconnection point and the contacts can be separated by inserting an external component or a portion thereof in an insertion direction from either the front or rear side of the module to contact at least one of the projections and cause the contacts to disconnect.

2. The telecommunications module according to claim 1, wherein the disconnection point on at least one contact projects from a plane parallel to the insertion direction (A) less than at least one projection projects when the external component is inserted.

3. The telecommunications module according to claim 1, wherein the contacts are spaced from each other at the at least one projection when they are in contact with each other at the disconnection point.

4. The telecommunications module according to claim 1, wherein the contacts are substantially identical to each other and are arranged symmetrically in the telecommunications module.

5. The telecommunications module according to claim 1, wherein at least one projection is rounded.

6. The telecommunications module according to claim 1, wherein at least one contact of said two contacts has projections on both sides of the disconnection point along the insertion direction.

7. The telecommunications module according to claim 1, in combination with at least one disconnection plug, at least one protection plug and/or at least one splitter module.

8. An assembly including at least one telecommunications module according to claim 1.

9. The telecommunications module according to claim 1, wherein the external component is a splitter, a disconnection plug or a test device.

* * * * *

UNITED STATES PATENT AND TRADEMARK OFFICE
CERTIFICATE OF CORRECTION

| | | |
|---|---|---|
| PATENT NO. | : 7,207,818 B1 | Page 1 of 1 |
| APPLICATION NO. | : 11/247402 | |
| DATED | : April 24, 2007 | |
| INVENTOR(S) | : Guy J. Barthes | |

It is certified that error appears in the above-identified patent and that said Letters Patent is hereby corrected as shown below:

Column 7,
Line 56, after "18," insert -- 20, --.

Signed and Sealed this

Twenty-eighth Day of August, 2007

JON W. DUDAS
*Director of the United States Patent and Trademark Office*